Oct. 2, 1962  C. A. KNOPPEL  3,056,167
MOLD FOR HIGH STRENGTH MEMBERS
Filed July 16, 1958  6 Sheets-Sheet 1

INVENTOR.
CURT A. KNOPPEL
BY
ATTORNEYS

Oct. 2, 1962        C. A. KNOPPEL        3,056,167

MOLD FOR HIGH STRENGTH MEMBERS

Filed July 16, 1958        6 Sheets-Sheet 2

INVENTOR.
CURT A. KNOPPEL

BY

ATTORNEYS

Oct. 2, 1962   C. A. KNOPPEL   3,056,167
MOLD FOR HIGH STRENGTH MEMBERS
Filed July 16, 1958   6 Sheets-Sheet 4

INVENTOR.
CURT A. KNOPPEL
BY
ATTORNEYS

Oct. 2, 1962 C. A. KNOPPEL 3,056,167
MOLD FOR HIGH STRENGTH MEMBERS
Filed July 16, 1958 6 Sheets-Sheet 5

INVENTOR.
CURT A. KNOPPEL

BY

ATTORNEYS

Oct. 2, 1962 C. A. KNOPPEL 3,056,167
MOLD FOR HIGH STRENGTH MEMBERS
Filed July 16, 1958 6 Sheets-Sheet 6

INVENTOR.
CURT A. KNOPPEL
BY
ATTORNEYS

United States Patent Office 3,056,167
Patented Oct. 2, 1962

3,056,167
MOLD FOR HIGH STRENGTH MEMBERS
Curt A. Knoppel, Grand Haven, Mich., assignor to Proman, Inc., Hudson, Ohio, a corporation of Michigan
Filed July 16, 1958, Ser. No. 748,925
9 Claims. (Cl. 18—42)

This invention relates to a high lineal strength member and to a method for making the same. More particularly, this invention relates to a member fabricated by forming a thermosetting resin and strands of fibrous material in a manner orienting the fibers in one direction and having the applied load evenly distributed throughout its length. This invention also relates to a method of winding strands of fibrous material on a mold member, the mold member being especially adapted to receive these strands.

This invention further relates to a method of molding such a member, and to a molding apparatus suitable for practicing this method.

Various types of molded members comprised of a nonwoven fibrous material combined with different resins are already in existence. Most of these members do not have the fibrous strands oriented in any one direction. Rather, during fabrication the strands are placed in a mold with the fibers running haphazardly in all directions. It has been known for sometime that if these fibers could be oriented in a single direction, the strength of the member would be greatly increased in the direction of the aligned fibers.

An instance in which a member having great lineal strength is required would be a connecting bar for securing high voltage lines to utility poles. Such power lines exert a high lineal load on the bar connecting them to the utility pole, while the lateral or side load is relatively small. Consequently, a bulky, heavy, and expensive member has been used in the past. A bar having great lineal strength is especially adapted to be used in place of such a member. Metallic connecting bars are not usable in this instance since they are electrical conductors.

However, up to the present time, a satisfactory member comprised of resin and fibrous material aligned in a single direction has not been developed. Past attempts to so align the fibers have not produced either the desired or expected results. The primary reason for this failure is the fact that the load applied to the member must be evenly distributed generally through the length of the member, rather than concentrated adjacent the ends thereof.

Further, this applied load must be evenly distributed between each of the fibers to achieve maximum strength. It is also important that resin concentrations be absent from the finished product, thereby eliminating weak points. Because the cross section of a member must vary to provide for attachment means such as end bushings, the fibers must be so aligned to also compensate for the lateral loads incident to this variance in cross section. Also, this fibers must lie in straight lines from end to end or these lateral loads become extremely great.

It is an object of this invention to provide a high lineal strength member having the fibers so oriented in the set resin as to achieve the expected results of such orientation. My member possesses a much greater lineal strength while being relatively small and compact, although less expensive to fabricate. This member possesses these attributes because the fibers are so aligned that the problems resulting in past attempts to fabricate such a member are solved, through proper laying of the fibers in the mold.

This invention provides a method of introducing fibers to a mold in such a manner. This method assures that the lineal load applied to the member will be evenly shared by the fibers, that most resin concentrations will be eliminated, and that the proportion of resin to fiber remains generally constant, despite changes in the cross section of the object. Further, this method provides for a greater resistance to lateral loads arising from the heavy lineal loads applied to the object.

This invention further provides a method of forming and molding this member when the fibers are so introduced to the mold.

A still further object is to provide a molding apparatus adapted to carry out this method.

Other objects of this invention will become obvious to those skilled in the art of high strength members and the molding and fabricating thereof upon reading the accompanying specification in conjunction with the accompanying drawings.

Briefly, this invention relates to a high lineal strength member molded from strands of fibrous material saturated with a thermosetting resin. Before molding, the strands are wound on a mold member in a manner orienting these strands lineally. This method of winding comprises another aspect of this invention and includes the steps of providing a mold form having first and second end bushings spaced substantially apart and a plurality of pins adjacent each of the end bushings, the pins being aligned along the axis passing through the end bushings. The strands of fibrous material are then wound around the first end bushing and next around the second end bushing from the opposite direction. The winding is continued by next passing the strand around the first end bushing together with the first pin adjacent to it. This winding is performed in the same direction as the initial winding about this end bushing. Next, the strands are wound around the second end bushing together with the pin next adjacent to it, in the same direction as the initial winding around the second end bushing alone. The winding is continued in this manner, each successive winding including an end bushing together with the pin next removed in distance from the one included in the previous winding, until all the pins are included in a winding.

Another aspect of this invention concerns the method of forming an article of strands of fibrous material and resin including the steps of providing a mold member having retractable pins positioned to support the strands of fibrous material and resin in a preselected pattern in the mold, compressing the fibrous material and resin from the sides and after sufficient compression has occurred initiating the retraction of the pins. Thereafter, the fibrous material and resin are progressively compressed and the pins are progressively retracted, the compression and retraction being coordinated so that when the compression causes the fibrous material to retain the position in which it was introduced into the mold, the pins are completely retracted.

Still another aspect of this invention relates to a molding apparatus adapted to be used for carrying out the methods briefly described above. This molding apparatus is adapted to compress the fibrous material and resin from the sides only after a cover member has been lowered on the molding member on which the fibrous strands have been placed. Means are provided to retract the pins from the mold during the molding operation.

Referring specifically to the drawings, reference numeral 1 (FIG. 12) designates the mold member on which the strands of fibrous material are wound. Mold member 1 is provided with two spaced recesses 23 and 24. Adjacent the recess 23, between the recesses 23 and 24, and lying on the axis between the two recesses, are two groups of pins 2 and 3, each group having a plurality of pins. The pins in group 2 are designated as 2a, 2b, 2c, 2d, 2e and 2f. Pin group 3 has similar pins 3a, 3b, 3c, 3d, 3e and 3f adjacent recess 24. These pins are slidably mounted in mold member 1, means 4 being provided at the bottom of mold member 1 for retracting the pins downwardly. The number of pins provided will vary with the size and shape of the article to be molded. A description of this equipment is provided at this point in order to understand the structure of the high lineal strength member and the method of winding fibrous strands comprising two aspects of this invention.

Stationary, spaced receiving and gripping means are provided, in the embodiment shown being posts 5 and 6 which removably seat in holes 7 and 8 provided in recesses 23 and 24 respectively. Bushings or members 9 and 10 are slidably mounted on posts 5 and 6. The bushing 9 has a tubular shank 11, bushing 10 a tubular shank 12, the bushings having end washers 13 and 13a and 14 and 14a respectively pressed or otherwise firmly secured on the ends thereof. The washers 13 and 14 are of a size such that they fit into and frictionally engage the edges of recesses 23 and 24 respectively. The bushing shanks 11 and 12 are of a length equal to the exposed portion of the pins extending above the mold member 1. It is on a mold member of this type, best shown in FIG. 12, that the strands of fibrous material are wound prior to the molding operation.

The method of winding strands of fibrous material on this mold board will now be described in detail. It should be noted that any fibrous material may be used in this method, so long as the material is sufficiently strong, adapted to form strands of considerable length, and exhibits desirable properties when formed into a molded member. Such properties include strength and stability in the temperature range of their expected use. While glass fibers are well adapted to form a high lineal strength member, this invention is not limited to glass fibers. It should further be noted that the fibers used in this winding may be saturated with a thermosetting resin before or after the winding. This aspect of this invention will be more fully described hereinafter.

The first step in the method of winding strands of fibrous material to orient the fibers in one direction is to provide a mold member as described hereinbefore.

Figure 5:
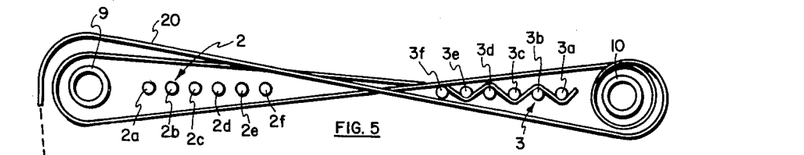
FIGS. 5 through 11 show the process of winding strands of fibrous material on a mold, illustrated step by step.

Referring to FIGS. 5 through 11, the successive steps of winding are schematically shown. The strand 20 may first be wound between each of the pins adjacent one of the bushings, FIG. 5 showing strand 20 wound under pin 3a, over pin 3b, under pin 3c, over pin 3d, under pin 3e and over pin 3f. This is a preferred starting step, although not absolutely necessary, as the initial step of the winding could simply be around one of the bushings. Irrespective of the exact point where the actual winding commences, the winding is performed with at least a limited tension applied to the strand 20. The illustration of the winding being performed without tension in FIGS. 5 through 11 is merely to enable the path of the strand to be clearly shown. The amount of tension applied is just under that which would break individual strands of fiber. The application of tension better assures proper alignment of the fibers. It also assures uniform load distribution between the fibers and development of maximum tensile strength in the final product. This is because each of the fibrous strands will share its portion of the load, eliminating unloaded strands which do not contribute to the strength of the member. Proper distribution of the load between the strands enables the member to attain substantially maximum theoretical strength.

Figure 6:
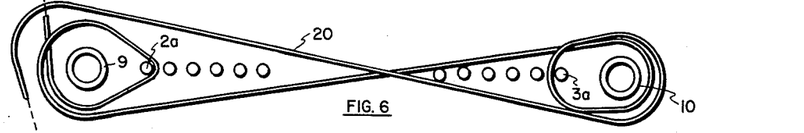

FIG. 5 next shows the step of winding strand 20 about the bushing 9 and then crossing in the area between the two rows of pins and winding in the opposite direction twice about bushing 10. Thus, the strand 20 is wound around each of the bushings, the windings being from opposite directions. The strand 20 is then laid in the area between the two sets of pins, around bushing 10 and drawn between the first two pins to pass it around the first pin 2a and is wrapped around bushing 9 again. The second passage around bushing 9 thus includes both the bushing 9 and the pin 2a, as shown in FIG. 6.

The strand 20 is then again crossed in the area between the two rows of pins and wound about bushing 10 together with pin 3a. In this wrapping, the strand 20 is passed twice about the sides and end of the bushing. The strand is then crossed in the area between the two rows of pins once again.

Figure 7:
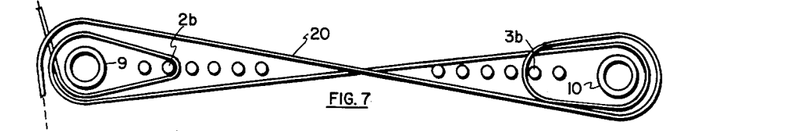

Proceeding to FIG. 7, the strand is next wound around bushing 9 together with pin 2b, the pin next removed from pin 2a adjacent this bushing. Again crossing in the area between the two rows of pins, strand 20 is wound around bushing 10 together with pin 3b.

Figure 8:
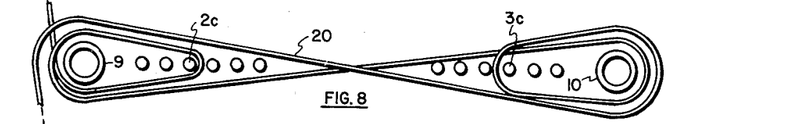

FIG. 8 shows successive windings from opposite directions of the strand 20 about the bushing 9 together with pin 2c and bushing 10 together with pin 3c.

Figure 9:
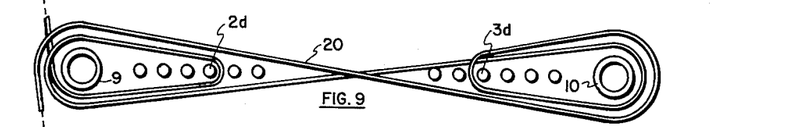
Figure 10:
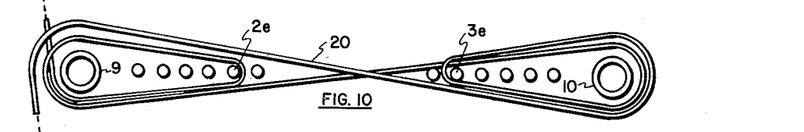
Figure 11:
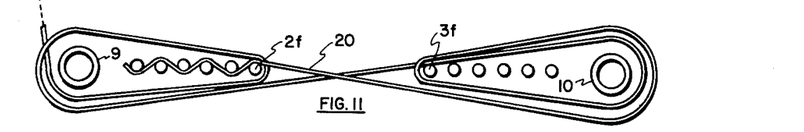

FIGS. 9, 10 and 11 illustrate the successive steps of winding strand 20 about the bushings, including the pin next removed from the last winding, until all the pins are included in such a winding. It is important that each time the strand is passed around a bushing it is so wrapped that a double thickness is applied to both the sides and the end of the bushing.

FIG. 11 shows an additional step of winding strand 20 over pin 2f, under pin 2e, over pin 2d, under pin 2c, over pin 2b and under pin 2a. This is a preferred completion step in the method of winding, although it must be understood that this step may be omitted. However, this step does result in added strength.

Figure 4:
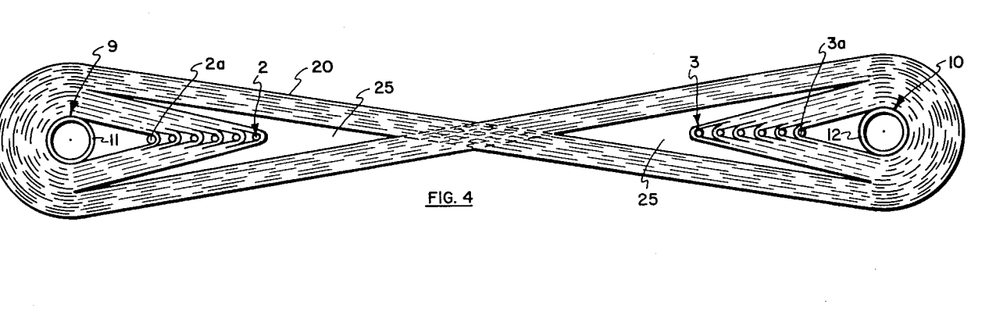
FIG. 4 is a plan view of the strand of fibrous material wound to form the member shown in FIG. 1, before molding.

FIG. 4 shows the strand 20 wound back and forth between the ends a number of times according to the steps of the method described above. However, while FIG. 4 shows the strands at the bushing laid one on top of another, it will be recognized that in actual practice the strand laps will to some extent lie between each other, making a more compact arrangement at this point and eliminating or largely eliminating the void pockets 25.

The number of passes made with the strand 20 between the end bushings will depend upon the desired cross section of the finished product and the strength it is desired to develop. The strand 20 itself consists of a number of individual fibers. The number of fibers in the strand 20 will depend upon the diameter of the strand and the diameter of the individual fibers. The size of strand 20 selected will be determined by the number of passes which are to be made between the end bushings to develop the required cross section of the finished product.

In this connection, it should be noted that the number of passes in one direction will be equal to the number of pins plus one. This is necessary to provide the proper quantity of fibers in the tapered end portions to maintain a uniform ratio of fibers to resin on each side of the end bushings and in the center of the finished product. This also maintains this ratio on the backs or the sides of the bushings along the axis of the member.

Figure 12:
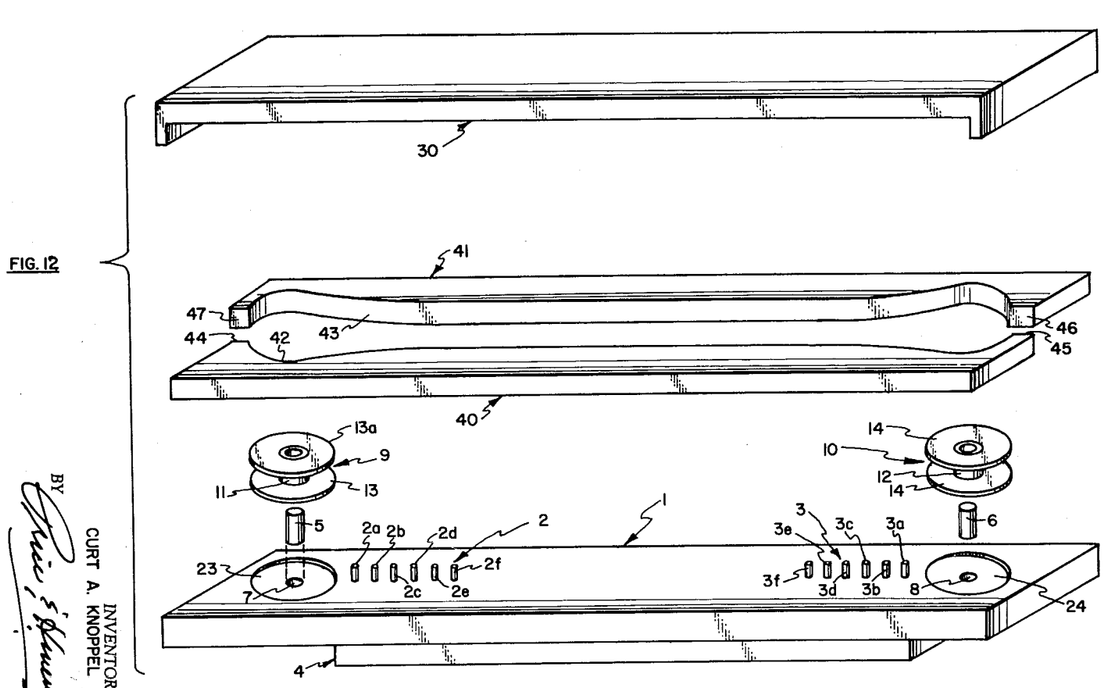
FIG. 12 is an exploded, perspective view of an embodiment of the molding apparatus used in fabricating the member shown in FIG. 1.

Adjacent the bushings 9 and 10 are areas void of fibrous material due to the shape of the bushings. Additional fibrous material may be used to fill these areas, thereby preventing excessive resin concentration in these areas. The reason for this step is that resin by itself does not possess great strength. Also, the resin shrinks during curing while the fibers do not shrink. Therefore, areas of excessive resin concentration will exhibit deformities due to shrinkage and in some cases cracking and other structural failures will occur. The differential in shrinkage will result in internal stresses, reducing the strength and durability of the product. With the strands wound as shown in FIG. 4 upon a mold member 1 as shown in FIG. 12, the fiber is ready to be molded to form the structure shown in FIG. 1.

As noted hereinbefore, a thermosetting resin is applied to the fiber. Preferably, the resin is applied to the strand before its introduction to the mold, as this has been found to be less time consuming.

More important is the fact that this permits thorough wetting of the fibers without omission of any areas so an ultimate product of uniform consistency and complete bondage is produced. It also permits more accurate regulation of the quantity of resin introduced. It is important both to the quality of the ultimate product and to its cost of production that the quantiy of resin introduced to the mold be limited accurately to that required to produce the product. Excessive resin introduction necessitates the use of bleed-off means and the attendant complications such as cleaning. However, the resin could be applied after the strand has been wound in the mold. Any thermosetting resin may be used. Polyester resins have been found to be satisfactory. Among the advantages of these resins is the fact that they cure at relatively low temperatures and pressures. They are comparatively inexpensive, have excellent dielectric properties and can be modified to have good exterior weathering properties. It must be understood, however, that the high lineal strength member comprising one aspect of this invention is not limited to any particular synthetic resin. It may be possible to employ extenders in the resin. It has been found that the preferred proportion of fibrous material to resin is approximately 65% to 75% fibrous material and 35% to 25% resin. For purposes of increasing the bond between the reinforcement fibers and the resin, particularly where glass is used, a suitable wetting agent may be used on the glass before impregnation of the strand. An example of such a wetting agent is a styrene.

Turning now to the molding apparatus and the method of molding this high lineal strength member comprising other aspects of this invention, the mold member 1 (FIG. 12) adapted to receive the strands of fibrous material according to the method outlined herinbefore has already been described in detail. It should be noted that the means 4 for raising and retracting the pins may be powered by any suitable means. Preferably a hydraulic or pneumatic power source is used because it permits accurate incremental regulation of the rate of movement of the pins. A detailed description of means 4 is not considered necessary since its basic structure is conventional and of itself forms no part of this invention.

Figure 14:
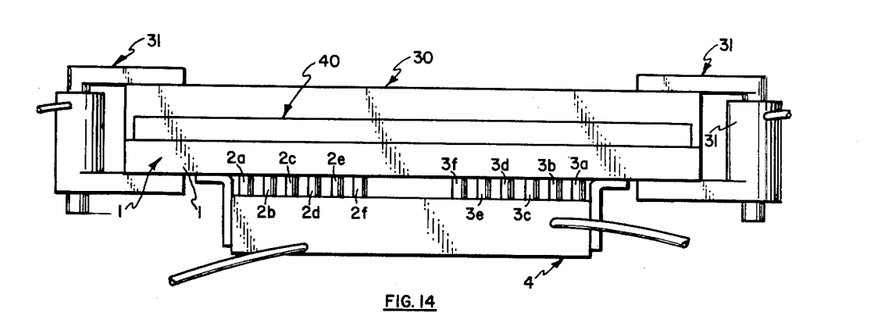
FIG. 14 is a side elevation view of the molding apparatus shown in FIG. 12, assembled and having the supporting pins withdrawn from the mold.

The molding apparatus also includes a cover 30 which is secured to the mold member 1 by the clamps 31 (FIG. 14). The clamps 31 may be of any construction but are illustrated as pneumatically or hydraulically operated mechanisms. They must be either removable or have a top arm which can be rotated away from the cover 30 to permit removal of the cover 30 for access to the top surface of the mold member 1.

Figure 13:
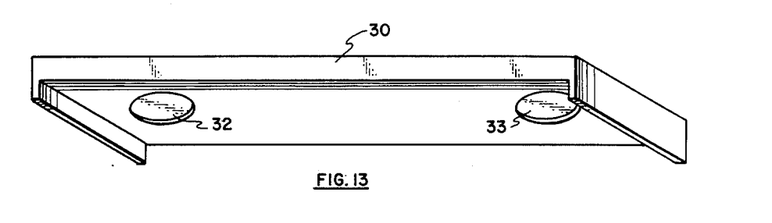
FIG. 13 is a perspective view of the lower face of the cover shown in FIG. 12.

A pair of spaced recesses 32 and 33 (FIG. 13), located on the bottom face of the cover 30, receive the washers 13a and 14a of bushings 9 and 10, respectively. It will be noted that the mold member 1 and the cover 30 securely hold and space bushings 9 and 10, and the fibers are held in the same position in which they were introduced to the mold board 1. The depth of the recesses 23, 24, 32 and 33 are such that the end washers of the bushings 9 and 10 are entirely received into them and the inner surfaces of these washers are flush with the surfaces of the mold halves 1 and 30.

Side members 40 and 41 are introduced to completely envelop the fibers wound on mold board 1 (FIGS. 12 and 14). These side enclosure members have inside surfaces 42 and 43 shaped to the configuration of the article to be formed. It will be noted that with this molding apparatus the article is formed by exerting pressure at the sides only. Pressure is applied to the side members 40 and 41 until these two side members engage each other at their respective ends 44, 45 and 46, 47, best shown in FIG. 12. When sufficient pressure has been applied to the sides of the fiber and resin mixture introduced on mold member 1, so that the fibers of strand 20 are forced to retain the position in which they were introduced to the mold member, retraction of the two groups of pins extending from mold member 1 is initiated. Pressure is then continuously applied to side members 40 and 41 until they engage each other, thereby forming the member described hereinbefore.

As the side members 40 and 41 are brought together the pins are retracted slowly. The rate of retraction is such that the resin is afforded sufficient time to flow into and fill the void created by withdrawal of the pins. In this manner, pressure being exerted by the side members 40 and 41 is maintained at a sufficient magnitude to cause the strands wound about these pins to retain their position. Should the pins be removed too rapidly, the resulting voids would reduce the squeezing pressure in this area, releasing the fibers from their clamped position and inducing resin to flow into this area from the central portion of the mold, i.e., the area between the two groups of pins would then be an area of relatively greater pressure. This would result in some resin starvation in that area.

Figure 17:
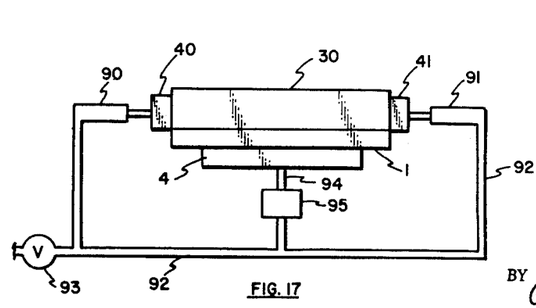
FIG. 17 is an end elevation schematic view of means for operating the mold to complete the formation of the article.

FIG. 17 illustrates one means of coordinating the squeezing action of the side members 40 and 41 and the retraction of the pin groups 2 and 3. The mold is placed between a pair of actuating cylinders 90 and 91. The pistons of these cylinders act as reins to squeeze the side members 40 and 41 together. The cylinders 90 and 91 are operated by a fluid under pressure supplied through the conduit 92 and their operation is regulated by the valve 93.

Leading off from the conduit 92 is a branch conduit 94 supplying the actuating mechanism 4 for the pin groups 2 and 3. This line passes through the pressure differentiator 95. As the pressure increases in the conduit 92 to actuate the reins of the cylinders 90 and 91, pressure is also exerted on the actuating mechanism 4 to retract the pin groups. The differentiator 95 coordinates the operation of the units so that the retraction of the pin groups 2 and 3 is in direct response to the pressure being exerted by the side members 40 and 41 on the contents of the mold.

Figure 15:
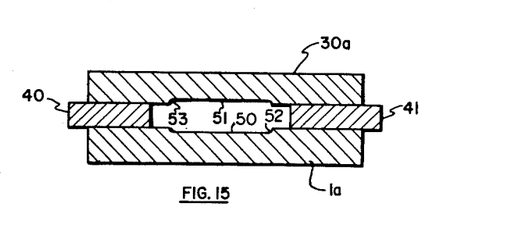
FIG. 15 is a cross sectional view of a modification of the molding apparatus shown in FIG. 14, taken along the plane XV—XV of FIG. 14.
Figure 16:
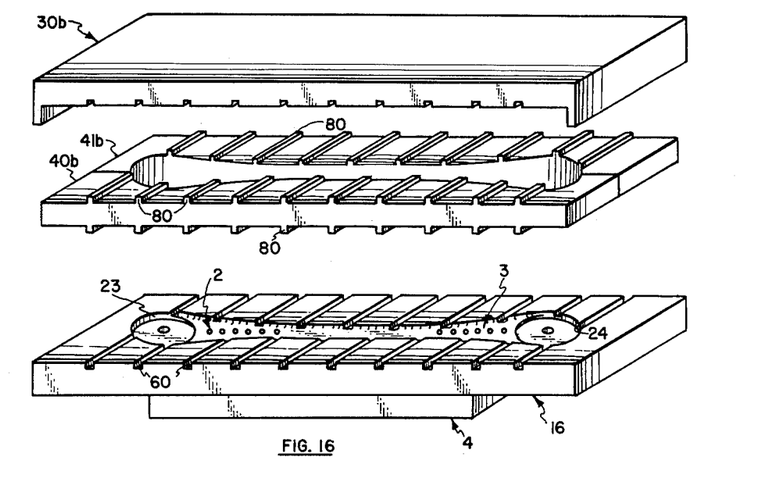
FIG. 16 is an exploded, top perspective view of the molding apparatus shown in FIG. 12, showing a further modification.

FIGS. 15 and 16 show a modification of the molding apparatus described above. Shallow recesses 50 and 51 are provided in mold member 1a and cover 30a, respectively. These recesses are shaped to the configuration of the top and the bottom of the article to be formed. The edges of the recesses 50 and 51 are filleted as shown at 52 and 53, respectively. It is contemplated that the recesses 50 and 51 will have a depth no greater than the radius of the fillets 52 and 53. The depending ends of the member 30 are the same as previously described except for a deduction in height corresponding to the combined depths of the recesses 50 and 51. They operate in the same manner.

It will be noted that the article formed by this modified molding apparatus will have rounded edges. When the fibers and resin are compressed, the resin tends to flow to the outside of the mold form. This means that the edges of the finished product and particularly where the exterior surfaces meet will be characterized by resin concentration. As noted previously, the resin by itself does not possess great strength and consequently these edges will tend to chip and crack, creating weak points along the length of the article. With this modification, the resin cannot flow to the edges of the mold form during compression. Thus, no resin concentrations are built on the surface of the article during its formation.

FIG. 16 shows this modification along with a still further modification. A plurality of grooves 60 are provided in mold member 1b, grooves 60 running laterally to the greater axis of the article to be formed. These grooves extend to the edges of the recess 50. Similar grooves 61 are provided in the cover 30b. These are parallel to the grooves 60 and terminate at the edges of the recess 51. Side members 40b and 41b are provided with a means to scrape, in the embodiment shown comprising a plurality of tongues or teeth 80 on their top and bottom surfaces. The tongues 80 are adapted to ride in the grooves 60 and 61. As pressure is applied to side members 40b and 41b, the tongues gather up any stray fibers and force them back into the mold cavity. This is important when the fibers tend to migrate laterally during the last part of the squeezing cycle. Without the tongue and groove arrangement, individual fibers may find their way between the side enclosure members and the mold member 1 or the cover 30. If this occurs, these fibers will be broken and the strength of the finished product proportionately lessened. Fibers escaping from the main mold cavity will interfere with the closing of the side mold members 40b and 41b. They will cause slight separation between the side members and the mold halves resulting in excessive flash lines on the product. The formation of such flash lines will induce additional fibers to migrate from the main mold cavity to become embedded in the flash. This reduces fiber content of the ultimate product and disturbs the fiber-resin ratio of the product. Removal of the flash then ruptures a significant quantity of the fibers. Also, the interference with the closing action of the side members may prevent their closure to the required position. This reduces the molding pressure and also results in an inferior product. The tongues act as a fiber rake with the grooves preventing the fibers from getting under or around the tongues.

The pressure on side members 40 and 41 is continuously increased simultaneously with the retraction of the pins. At a pressure of 20 to 30 pounds per square inch, the side members 40 and 41 will engage each other. The molding apparatus is then heated to a curing temperature of approximately 200° F. for about a three minute period. The temperature and time recited is merely illustrative because it will vary with the type of resin employed and the mass and configuration of the product being molded. The curing temperature may be attained either by subjecting the mold as a whole to an atmosphere of the correct elevated temperature or heating means may be incorporated in the mold itself. The latter could be accomplished by the provision of passageways for hot water or steam or the incorporation of suitable electrical resistors in the mold. Dielectric heating may also be feasible.

The side mold members 40 and 41 are then removed as well as the cover 30. If necessary, knock-out pins may be provided to remove the formed articles from the mold member 1. Where the recesses 50 and 51 are employed, the pin groups 2 and 3 may be used as knockouts. Knock-out pins can also be arranged to operate against the end bushings.

This member, formed by the method herein described, produces a high lineal strength product having fibers oriented in the manner in which they were introduced to the mold member 1. Fibers aligned according to the method described hereinbefore produce a member having high lineal strength.

Figure 18:
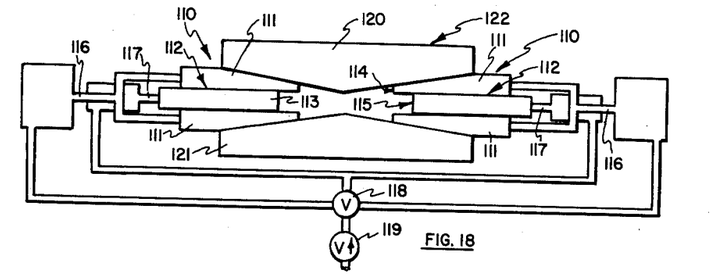
FIG. 18 is an end elevation schematic view of a mold having converging faces and of means for closing it.

FIG. 18 illustrates the adaptation of this invention to a product of such design that it is necessary to have converging faces on the upper and lower mold halves in the direction of closing movement of the side mold members 40 and 41. If it were attempted to place the material in the mold cavity under pressure by the inward movement of a single tapered side member, the resin and reinforcement would squeeze out between the side mold member and the tapered face of the mold preventing proper closing. This would produce an unsatisfactory product since it would have excessive flash, permitting the reinforcement fibers to become embedded in the flash where they will be destroyed in removal of the flash. Proper molding pressure could not be obtained nor could it be properly regulated. These are but some of the difficulties attendant this problem.

FIG. 18 illustrates a solution to this problem involving the use of split side mold members 110 between the halves 120 and 121 of the mold 122. Each split side mold member 110 consists of a pair of tapered mold mating elements 111 which, when inserted to their maximum position, define a slide channel 112 fitting about the pressure element 113. The inner faces 114 of the mold mating elements define a portion of the side faces of the finished product produced by the mold. After the mold mating elements 111 have been inserted to their final position, the pressure elements 113 are moved until their inner faces 115 are flush with the inner faces 114 of the mold mating elements 111. This provides the necessary molding pressure and enables this pressure to be accurately regulated.

Figure 19:
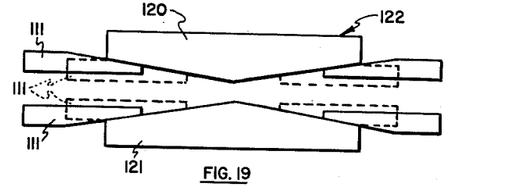
FIG. 19 is a schematic view of a further modification of the structure illustrated in FIG. 18.

In some instances the mold mating elements can simply be inserted in the mold. This would be the case where the taper involved only one side of the mold while the other side was straight. However, in many cases this is not possible because some resin reinforcement will be caused to flow between them and the faces of the mold halves 120 and 121. This can be overcome as suggested in FIG. 19 wherein the mold mating elements 111 are caused to seat firmly against the tapered sides as they are initially introduced. Then, as they are moved inwardly, they converge as indicated in phantom. This forces all resin and fibers to escape the central cavity only by means of the slide channel 112 for the pressure elements. As the pressure elements are subsequently introduced and moved inwardly, this material is gathered up and forced back into the mold cavity. Suitable structure may be provided to guide the mold mating elements 111.

Figure 20:
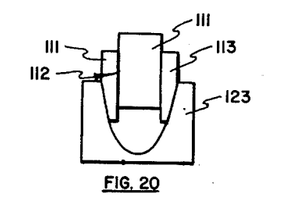
FIG. 20 is a schematic view of a modified application of the invention illustrated in FIGS. 18 and 19.

It will be recognized that the tongue and groove arrangement illustrated in FIG. 16 can be applied to the mating surfaces between the mold mating elements 111 and the pressure elements 113 and to the mating surfaces of the mold halves 120 and 121 and the mold mating elements 111. It will also be recognized that where the product involves tapered surfaces only on one side that the arrangement illustrated in FIGS. 18 and 19 would be applied to one side only. The opposite side could utilize the side mold members illustrated in FIG. 12 or could be completely stationary as suggested in FIG. 20. In this the mold 123 consists of a single piece having a generally U-shaped cavity in one side of which the mold mating elements 111 and the pressure element 113 are received. Such an arrangement still permits the fibers to be placed in the mold under tension and in longitudinal alignment. It will also be understood that where tapered sides in the closing portion of the mold 123 are unnecessary the mold mating elements 111 can be eliminated and only the pressure element 113 used.

The closing of the sides of this mold can be accomplished in any suitable manner. As illustrated in FIG. 18, the mold mating elements may be independently inserted by the pistons 116 and the pressure elements by the pistons 117. The pistons 116 will be actuated first by means of the selector valve 118. After the mold mating elements have been inserted to the proper depth, the selector valve 118 is manipulated to actuate the pistons 117 controlling the squeezing movement of the pressure elements 113. The closing of the mold sides is regulated by the master valve 119. The power source for the pistons 116 and 117 may be either pneumatic or hydraulic. It will be recognized that various other means may be employed.

Where the mold mating elements 111 move both inwardly and toward each other, suitable means may be provided to support and guide their movement. This could be in the form of mechanical linkages or other means which will assure their firm contact with the faces of the mold halves 120 and 121.

Method and Operation

While the method of introducing the fibers to the mold and the resulting article are described herein, these phases of this invention are the subject of my co-pending application entitled, High Lineal Strength Member and Method of Making Same, Serial No. 748,926, filed simultaneously with this application.

Figures 1, 2:
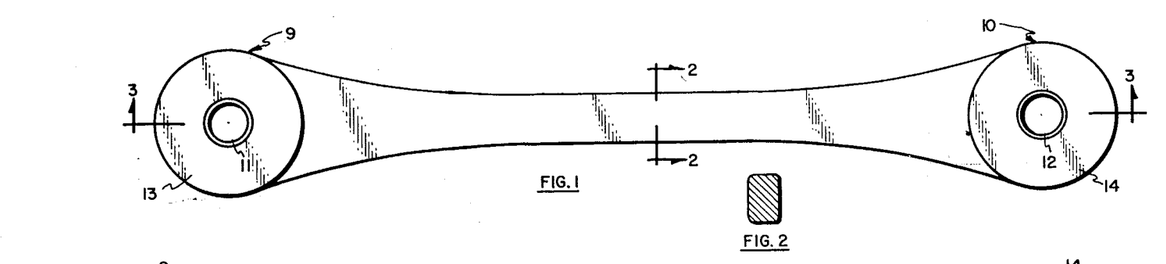
FIG. 1 is a plan view of an embodiment of the high lineal strength member.
FIG. 2 is a cross sectional view taken along the plane II—II of FIG. 1.
Figure 3:
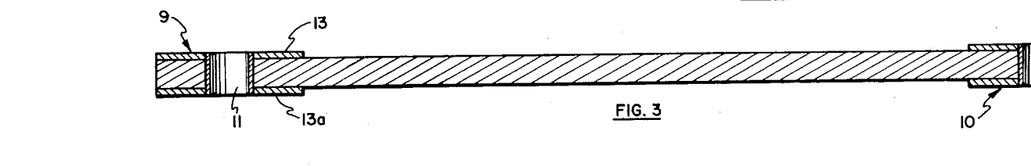
FIG. 3 is a cross sectional view taken along the plane III—III of FIG. 1.

The high lineal strength member of this invention, an embodiment of which is shown in FIG. 1, is formed as follows. A mold member 1 is provided, into which one or more strands of fibrous reinforcement material are introduced. This mold member includes means for receiving and holding stationary spaced members about which the reinforcement is wrapped. A plurality of pins adjacent to each of the receiving and holding means extending above the surface of the mold member and lying on the axis between the receiving and holding means is provided. These pins are adapted to be slidably retracted to a position flush with the surface of the mold member.

In the embodiment of the high strength member shown in FIG. 1, the end bushings become the attachment eyelets of the connecting bar produced by this invention. The end washers, 13, 13a, 14 and 14a, become the wear plates and load distribution members of the finished product.

Strands of fibrous material are then introduced on this mold member, according to the previously described method. As shown in FIGS. 5 through 11, a strand having a preselected number of fibers is wound under tension around the end bushings and pins as previously described and illustrated in FIGS. 5 through 11. The number of times the strand will be wound back and forth in the mold will depend upon the size of the finished product and its desired ultimate strength. It will also depend upon the number of fibers grouped in the strand. This will be predetermined because the mold will have to provide a quantity of pins 2 and 3 corresponding to the number of windings of the strand. Preferably, the resin is applied to the strand in accurately measured quantities before the strand is introduced to the mold.

The mold used in this invention embodies a new principle in this type of molding. Its concept is that of providing two stationary spaced surfaces with the moldable material or target between them. Molding pressure is obtained by squeezing or ramming the moldable material or target at least from one side with the squeezing element operating between parallel surfaces. Depending on the nature of the article to be molded, the squeezing action may be conducted from one or both sides. Where the surfaces of the mold are not parallel along the open side into which the squeezing element is introduced, additional elements are provided to make parallel the sides of the passage in which the squeezing element travels.

After the introduction of the strand is complete, the cover 30 is lowered on mold member 1 and secured by suitable means such as the clamps shown in FIG. 14. Side members 40 and 41 are slidably inserted between the mold board 1 and cover 30. With the mold board and cover held in a stationary position, pressure is applied to side enclosure members 40 and 41. Any suitable means may be employed to force the side members 40 and 41 inwardly. One or more clamps or suitable hydraulically or pneumatically actuated pistons will serve this purpose. As the side enclosure members 40 and 41 move toward the fiber-resin mixture, the fibrous material is raked toward the center of the molding apparatus.

After sufficient compression has been applied to prevent the fibrous material from moving from the position in which the fibers were introduced into the mold member, the two groups of pins are retracted progressively into the surface of the mold member to a point where they lie flush with the surface thereof. Pressure on the side members 40 and 41 is progressively increased simultaneously with the retraction of the pins. The compression and pin retraction are coordinated so that the fibers retain their position. Pressure is continuously applied until the two side enclosure members engage each other. The fiber-resin mixture is then heated to approximately 200° F. and allowed to cure until the resin is set. The member is then removed from the mold.

The member thus formed provides maximum strength for a minimum cross section and a minimum quantity of material. The fibers are aligned in a single direction, thereby providing maximum lineal strength. The fibers are tensioned within the member, providing uniform load distribution between all of the fibers, thereby assuring that each individual fiber bears its portion of the load. Uniformity of fiber-resin ratio midway between the ends of the member and at the area around the end bushing is achieved. The novel method of introducing the fibers to the mold assures that exactly the same number of fibers are present at the center of the member and at the sides and end of the bushing. This further assures maximum strength from a minimum quantity of material, because all fibers used are bearing their share of the load both in the center and at the end of the member.

Because of the end bushings, the cross section of the member is greater at the end than at the center. However, because the strand of fibrous material is positioned so that the fibers lie in relatively straight lines from one end of the member to the other, lateral loads are largely eliminated. This means that the application of operational lineal loads of a magnitude approaching the ultimate theoretical strength of the member will not generate substantial lateral loads. In similar products manufactured by conventional methods and utilizing conventional designs, this lateral loading tends to rupture the member near the end bushings. Furthermore, as the cross section of the member increases near its ends, it will be noted that by winding around the pins, certain portions of the fiber are aligned laterally. This still further eliminates lateral loads, so that the full benefit of lineal fiber alignment can be obtained.

Because articles comprised of resin and fibrous material are very strong initially, tremendous lineal strength is achieved by aligning the fibers as herein described. It has been found that articles formed according to the methods of this invention possess nearly twice the lineal strength of articles formed without orientation of the fibers during fabrication. Therefore, an article requiring a certain strength can be much more compact, require less material and, therefore, be manufactured at a substantially lower cost.

Figure 21:
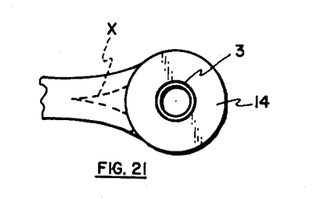
FIG. 21 is a fragmentary view of the configuration of an article made according to this invention used in a comparative test.

Structural tests have been applied to parts incorporating this invention. A member of the configuration illustrated in FIG. 1 having a center to center spacing between the bushings of 14 inches and at the narrowest center portion a height of ⅝ of an inch and a width of ⅝ of an inch was tested. In test B the article had the configuration shown in FIG. 1 and in test A the sides were somewhat necked in at the bushings as illustrated in FIG. 21. In both cases the articles had a resin to fiber ratio of 25% to 75%. The resin used was a polyester identified as type MR–37 High Reactivity Polyester Resin by the manufacturer Celanese Corporation of America. The resin was cured at room temperature. The reinforcement used was filamentary glass. The tests were performed on a Gleen testing machine with a head speed of 0.1 in./min. The tests were continued until some visible rupture occurred.

| Test | Initial Fiber Yield, Lbs. | Ultimate Load, Lbs. | Rupture Phenomenon |
| --- | --- | --- | --- |
| A | 4,400 | 18,875 | Fibers of article started to open. |
| B | 6,600 | 22,265 | Article appeared to explode. |

It will be observed that in both tests very high ultimate loads were obtained. In test A rupture initially occurred in the form of separation along the broken lines marked "X" in FIG. 21. This was not observed even after substantially greater loading in test B. This is indicative of the importance of keeping the fibers straight between their points of tangency with the end bushings.

The "exploding" observed in test B is indicative of the article having attained substantially maximum loading of the fibers with a very high degree of uniformity of load distribution between the individual fibers. Had this not been true, gradual rather than sudden failure would have been observed.

In both tests the initial fiber yield point was determined audibly. It was established at the load at which the first "click" was given by the member indicating the rupture of a fiber.

The molding apparatus and method of molding of this invention provide a simple yet expeditious way to introduce the fibrous material into the molding apparatus. The initial mold member is open on all four sides and is provided with spaced recesses to receive the spools or bushings of the article to be formed. The strands of fibrous material may be quickly and efficiently introduced to this mold member, passed around the end members and the retractable pins.

Means are provided so that the formed article has only rounded edges, without a resin concentration being built up at these edges. The resin-fiber mixture is squeezed only from the sides and the chance of formation of pockets of resin concentration within the article is virtually eliminated. By withdrawing the pin holding the fibrous material in aligned position simultaneously with the compression of the resin-fiber mixture, these fibers must remain in the position in which they were introduced to the mold. Means may also be provided to rake the strands of material into the center of the mold, thereby assuring that individual fibers are not broken during the compression process.

Figure 22:
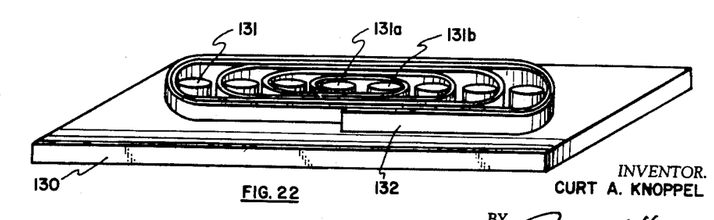
FIG. 22 is an isometric somewhat schematic view of a modified application of the method of introducing fibers to the mold.

The broad scope of the method of laying the fibers in the mold is illustrated in FIG. 22. It is not limited to an arrangement involving the use of end bushings and retractable pins. As shown in FIG. 22, the lower mold half 130 may be equipped with a plurality of inserts 131 about which the fibers 132 in oriented strand form are wrapped starting with the two inner inserts 131a and 131b. The inserts 131 may be retractable in the same manner as the pins in FIG. 12. However, they may remain stationary in the mold to create openings through the finished article or they may be in the nature of inserts which become permanently incorporated in the final product. It will be noted that in placing the strand of fibers 132 around the inserts 131 the looping arrangement illustrated in FIGS. 5–11 is not employed. However, the principle of so introducing the strand that the fibers 132 are aligned longitudinally of the finished article and are prestressed is retained.

It will be noted that the first loop of the fiber strand 132 encompasses the two inner most supports 131a and 131b and progressively encompasses additional pairs of the support 131 until all supports have been included in the loops or wrappings. Each successive loop engirds the previously formed loops. The strand 132 is introduced under tension. Thus, the several loops are seated tightly about the supports and the previously formed loops. This produces a compact preform of the material even before it is subjected to pressure in the mold.

This invention is not limited to the particular order of winding the strand about the pins or supports illustrated in the drawings. Considering the disclosure in FIG. 22, the wrapping could be initiated about the two supports at one end of the row of supports and continued with each loop passing around the end support and encompassing successively further removed pins with each lap. It will be recognized that in this connection, in FIG. 5, the wrapping could first be step by step about all of the pins at one end then about all of the pins at the other end. After this was completed the loops of the strand which extend from one bushing to the other could be formed in the mold.

This invention eliminates the problems heretofore preventing the satisfactory fabrication of articles comprised of unidirectionally oriented fibrous material embedded in a resin matrix. However, is must be understood that only certain embodiments of the features of this invention have been described, and certain other embodiments could be fashioned without departing from the principles of this invention. Each of these embodiments are to be considered within the spirit and scope of this invention, unless the accompanying claims expressly state otherwise.

I claim:

1. In a mold member adapted to receive fibrous material for forming articles containing the same, spaced means for receiving and holding stationary spaced members about which fiber is to be wrapped; a plurality of pins adjacent each of said receiving and holding means extending beyond the surface of said mold member, said pins lying on the axis between said receiving and holding means; and means for slidably retracting said pins to a position flush with the surface of said mold member.

2. A mold for forming an article under pressure comprising: spaced top and bottom members; a pair of side members slidably received between said top and bottom members from opposite sides thereof and with said top and bottom members defining a mold cavity; said side members being the sole pressure generators for said mold; a plurality of pins slidably projecting through one of said mold members and means for reciprocating said pins through said mold member, the retractive movement of said pins being progressive and coordinated with the converging movement of said side members.

3. Molding apparatus for forming an article of fibrous material and resin comprising: a mold member having spaced gripping means for holding end members about which fibers are wrapped; a plurality of pins adapted to have fibers wrapped about them, slidably mounted in said mold members adjacent each of said gripping means, said pins lying generally on the axis between said gripping means and extending from the surface of said mold member; a cover member and means for applying pressure to both sides of the article to be formed; and means for retracting said pins into the surface of said mold member as pressures are applied.

4. Molding apparatus for forming an article of fibrous material and resin, comprising: a mold member having a plurality of pins adapted to have fibers wrapped about them; said pins slidably mounted in said mold member and extending from the surface of said mold member; means for covering and applying pressure to both sides of the article to be formed; and means for retracting said pins into the surface of said mold member as pressures are applied.

5. Molding apparatus for forming an article of fibrous material and resin, comprising: a first mold member having spaced gripping means for holding end members about which fibers are wrapped; a plurality of pins adapted to have fibers wrapped about them, slidably mounted in said first mold member adjacent each of said gripping means, said pins lying generally on the axis between said gripping means and extending from the surface of said first mold member; a second mold member adapted to cover said first mold member; a pair of side mold members, said side mold members having inside surfaces shaped to the configuration of the article to be formed; said side mold members being slidable between said first and second mold members for squeezing the contents of said mold; and means for retracting said pins into the surface of said first mold member as said side mold members converge.

6. Molding apparatus for forming an article of fibrous material and resin, comprising: a first mold member having spaced gripping means for holding end members about which fibers are wrapped; a plurality of pins, adapted to have fibers wrapped about them, slidably mounted in said first mold member adjacent each of said gripping means, said pins lying generally on the axis between said gripping means and extending from the surface of said first mold member; grooves in said first mold member, said grooves running generally normal to said axis and terminating at points conforming to the configuration of the article to be formed; a second mold member adapted to cover said first mold member; said second mold member having grooves running generally normal to said axis and terminating at points conforming to the configuration of the article to be formed; a pair of side mold members, said side mold members having inside surfaces shaped to the configuration of the article to be formed; teeth on the tops and bottoms of said side mold members, said teeth adapted to ride in said grooves in said first and second mold members and rake the fibrous material inwardly; means for applying pressure inwardly on said side mold members; and means for retracting said pins into the surface of said first mold member as said pressures are applied.

7. Molding apparatus for forming an article of fibrous material and resin, comprising: a first mold member having spaced gripping means for holding end members about which fibers are wrapped; a plurality of pins, adapted to have fibers wrapped about them, slidably mounted in said first mold member adjacent each of said gripping means, said pins lying generally on the axis between said gripping means and extending from the surface of said first mold member; a recess in said first mold member, said recess shaped to the configuration of the article to be formed and having edges rounded toward said axis; a second mold member adapted to cover said first mold member, said second mold member having a recess shaped to the configuration of the article to be formed and having edges rounded toward said axis; a pair of side mold members, said side mold members having inside surfaces shaped to the configuration of the article to be formed; said side mold members being slidable between said first and second mold members for squeezing the contents of said mold; and a motive element for progressively retracting said pins into the surface of said first mold member; the retraction of said pins being coordinated with the inward sliding movement of said side mold members.

8. Molding apparatus for forming an article of fibrous material and resin, comprising: a first mold member having spaced gripping means for holding end members about which fibers are wrapped; a plurality of pins, adapted to have fibers wrapped about them, slidably mounted in said first mold member adjacent each of said gripping means, said pins lying generally on the axis between said gripping means and extending from the surface of said first mold member; a recess in said first mold member, said recess shaped to the configuration of the article to be formed and having edges rounded toward said axis; grooves in said first mold member, said grooves running generally normal to said axis and opening into said recess; a second mold member adapted to cover said first mold member, said second mold member having a recess shaped to the configuration of the article to be formed and having edges rounded toward said axis; said second mold member having grooves running generally normal to said axis and opening into said recess; a pair of side mold members, said side mold members having inside surfaces shaped to the configuration of the article to be formed; teeth on the tops and bottoms of said side mold members, said teeth adapted to ride in said grooves in said first and second mold members and rake the fibrous material inwardly; said side mold members being inwardly movable for applying pressure to the contents of said mold; and means for retracting said pins into the surface of said first mold member as said pressures are applied.

9. Molding apparatus for forming an article of fibrous material and resin, comprising: a mold member having a plurality of pins adapted to have fibers wrapped about them; said pins slidably mounted in said mold member and extending from the surface of said mold member; means for covering and applying pressure to both sides of the article to be formed; means to scrape fibers inwardly as said pressures are applied; and means for retracting said pins into the surface of said mold member as said pressures are applied.

References Cited in the file of this patent

UNITED STATES PATENTS

| | | |
|---|---|---|
| 791,648 | Richards | June 6, 1905 |
| 1,605,356 | Leipert | Nov. 2, 1926 |
| 2,377,335 | Finlayson et al. | June 5, 1945 |
| 2,423,196 | MacKendrick | July 1, 1947 |
| 2,688,776 | Evans | Sept. 14, 1954 |
| 2,746,514 | Warnken | May 22, 1956 |
| 2,791,804 | Talmage | May 14, 1957 |
| 2,859,936 | Warnken | Nov. 11, 1958 |
| 2,980,158 | Meyer | Apr. 18, 1958 |

FOREIGN PATENTS

| | | |
|---|---|---|
| 497,897 | Italy | May 1956 |